T. A. WILLSON.
SPECTACLE-FRAMES.

No. 193,739. Patented July 31, 1877.

Witnesses
Harry A. Crawford
Harry Smith

Inventor
Thomas A. Willson
by his Attorneys
Howson and Son

UNITED STATES PATENT OFFICE.

THOMAS A. WILLSON, OF READING, PENNSYLVANIA, ASSIGNOR TO HIMSELF, GILE J. WILLSON, AND CLEMENT B. BISHOP, OF SAME PLACE.

IMPROVEMENT IN SPECTACLE-FRAMES.

Specification forming part of Letters Patent No. 193,739, dated July 31, 1877; application filed May 7, 1877.

*To all whom it may concern:*

Be it known that I, THOMAS A. WILLSON, of Reading, Berks county, Pennsylvania, have invented a new and useful Improvement in the Manufacture of Spectacles, of which the following is a specification:

The object of my invention is to connect together the elliptical hoops or eyes of a pair of spectacles and the bridge in the simple, economical, and substantial manner which I will now proceed to describe, reference being had to the accompanying drawing, in which—

Figure 1:
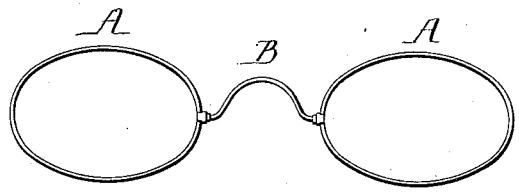
Figure 2:
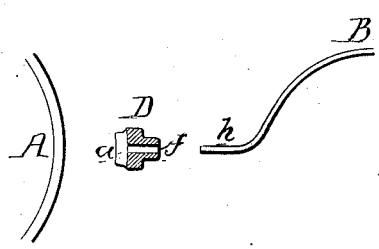

Figure 1 represents the hoops and bridge connected together; and Figs. 2, 3, 4, and 5, detailed parts drawn to an enlarged scale, and illustrating the mode of carrying my invention into effect.

The two eyes A A are grooved internally, in the ordinary manner, to receive the glasses, and are connected to the bridge B through the medium of blocks D, in the manner which I will now proceed to describe.

Each block has a groove, $a$, adapted to that part of one of the eyes to which it has to be secured, and in each block is an orifice, $f$, for receiving one of the straight ends $h$ of the bent-wire bridge B.

Figure 3:
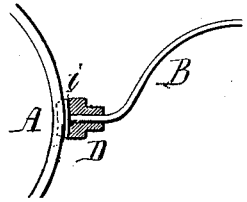
Figure 4:
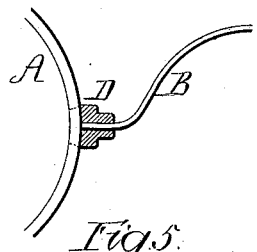
Figure 5:

In securing the parts together one of the eyes and the block, with the end of the bridge inserted into the latter, are held in the position Fig. 3 by a suitable instrument, a piece of solder, $i$, having been introduced between the eye and the block. On the application of heat the solder will melt, and consequently yield to the pressure of the instrument, and the block will be brought close to the eye, as shown in Fig. 4, a thin film only of solder intervening between them; at the same time the solder will penetrate into the orifice of the block, and thereby secure the same to the bridge, which will consequently be united to the eye in a substantial manner.

I claim as my invention—

The combination of the eyes of a pair of spectacles and the wire bridge B with the blocks D, soldered to the eyes, and having perforations $f$, as and for the purpose described.

In testimony whereof I have signed my name to this specification in the presence of two subscribing witnesses.

T. A. WILLSON.

Witnesses:
HERMANN MOESSNER,
HARRY SMITH.